United States Patent Office 3,371,061
Patented Feb. 27, 1968

3,371,061
COMPOSITION OF MATTER FOR DECORATIVE ARTICLES USING EGGSHELLS AS FILLERS
Audra E. Pickett, 10372 S. White Rock Road, Rancho Cordova, Calif. 95670
No Drawing. Filed Aug. 29, 1966, Ser. No. 575,531
14 Claims. (Cl. 260—40)

ABSTRACT OF THE DISCLOSURE

A composition of matter comprising an intimate mixture of comminuted egg shells, which may be dyed, bonded together by a clear resin, an article manufactured of such composition, and a process for producing such composition and article is disclosed.

This invention relates to a composition of matter comprising an intimate intermixture of comminuted egg shells which may be dyed and a polymerized resinous material, an article of manufacture composed of this composition of matter and a method for producing said article of manufacture.

It is an object of this invention to provide an article of manufacture having a pleasing, decorative appearance similar to pottery and the like.

It is a further object of this invention to provide an article of manufacture which may be of a single color or of variegated colors having a pleasing pottery-like appearance.

It is yet another object of this invention to provide a composition of matter which may advantageously be used in producing decorative forms and objects.

An additional object of this invention is to provide a composition of matter which includes comminuted egg shells, which may be dyed and which may be of more than one size for producing articles of manufacture having a pleasing pottery-like appearance.

It is yet an additional object of this invention to provide a method for producing an article of manufacture having a pleasing pottery-like finish.

An additional object of this invention is the production of pleasing pottery-like surfaced articles of manufacture having beauty and utility.

A still further and important object of this invention is to provide a method for using egg shells which are commonly discarded in an advantageous way to produce articles of manufacture having a pleasing appearance and surface texture.

Other objects will appear from the following specification.

It is known to produce articles of manufacture from resinous materials using inert fillers therein. Such inert fillers commonly include natural or manufactured calcium carbonate, titanium dioxide, pigments and the like. In general, such compositions of matter and the articles produced therefrom have the general appearance of ceramic materials.

Natural products which may be used as fillers are disclosed in the prior art also. For example, it is known to use ivory scrap, clam, oyster and other crustacean shells and to use dyed oyster shells and the like. Generally speaking such materials are satisfactory for many purposes but they are frequently difficult to obtain and to handle. For most desirable results, it is often necessary to bleach or otherwise treat such natural products before they may be used as fillers. While some of these natural products may be dyed there is frequently difficulty encountered in obtaining a uniform coloring. Such materials as sea shells and the like frequently have non- porous surfaces in whole or in part which resist the penetration and adherence of dye.

I have discovered that egg shells, a universally obtainable material which is generally considered a waste by-product, may advantageously be used in intermixture with a polymerized resinous material to produce articles of manufacture having the appearance of pottery which may be of great beauty and utility.

I have further discovered that egg shells have an unusually desirable affinity for dyes which are commonly available.

I have discovered that compositions of matter comprised of intimate intermixtures of comminuted egg shells, either dyed or of natural color, may be used to produce articles of manufacture of great beauty and utility.

I have also discovered a process for utilizing egg shells for producing articles of manufacture which have very pleasing pottery-like texture. This texture, in contrast with the ceramic-like texture of materials of the prior art, has an interesting and quite distinctive appearance.

In carying out the process of this invention, a quantity of egg shells are provided. The inner membrane is removed and the egg shells are crushed or otherwise comminuted to any desired size. The egg shells may be very finely ground or may be merely crushed to small flakes, for example, one-eighth to one-fourth inch across. It is not necessary to classify the egg shells according to their different sizes; however, it is generally desirable to classify them by conventional screens or by other means to give a more uniform decorative effect. In addition, it is sometimes desirable to use two distinct sizes of classified egg shell fragments.

An important feature of this invention is in the discovery that these comminuted egg shell fragments are unusually receptive to ordinary food dyes and other household dyes as well as industrial dyes. It is believed that the high porosity of the egg shell fragments accounts for this receptiveness to dyes. It is therefore often highly desirable to dye all or part of the comminuted egg shell fragments to be used in the composition. Very desirable results are obtained by mixing a portion of dyed egg shell fragments with a portion of untreated egg shell fragments or with egg shell fragments of one or more different colors. A particularly attractive product is also obtained by dying the egg shells prior to comminution thus exposing the undyed inner shell layers.

In a modification of the above process, the inner membrane need not be removed. When the membrane is removed, the extremely finely ground shell accepts dyes to produce a clearly colored product, whereas when the membrane is left intact during the shell grinding process, the membrane produces a darker tone than shells with the membrane removed thus giving an extremely pottery-like appearance.

A resin precursor which is capable of undergoing polymerization is often provided. Generally speaking, such resin precursors as methyl acrylate or the polymerizable esters are very suitable for this invention. Epoxy resins are also highly desirable for producing the composition and the article of this invention. In a specific example, an all purpose clear polyester resin sold under the trademark of "Natcol 410" and the Natcol catalyst, methyl ethyl ketone peroxide, is quite satisfactory. The Natcol catalyst or initiator is added to about one part per 80 parts of liquid resin by volume. Three parts of dry comminuted egg shells, dyed or undyed, were added to every two parts, by volume, of the polymerizable precursor. The proportion of egg shells to the resin may be varied to obtain different effects. The egg shells and the polymerizable resin precursor were intimately mixed together and poured into a mold which had been previously treated with a release compound, such as a silicone compound known in the art. The mold contents were then maintained at approximately 100° Fahrenheit for one half hour to cause the resin to set or polymerize. Polymerization will occur at ambient temperature in about eight to twelve hours.

It will be realized by those skilled in the art that variation from one-eightieth part catalyst with respect to the resin may be desirable depending upon the temperature desired for curing and the desired drawing time. Such castings may be produced with less catalyst and by drying in a moderately hot oven. I have also used TAP liquid casting resin, and Fitzgerald brand liquid casting resin. All these resins seem to produce similar results.

Natcol resins are manufactured and distributed by Natcol Plastics Company, Redlands, Calif.; TAP resins are made and distributed by Reichhold Chemicals, Inc., 523 N. Broadway, White Plains, N.Y.; and Fitzgerald resins are manufactured and distributed by Pittsburgh Plate Glass Company, One Gateway Center, Pittsburgh, Pa.

Resins suitable for the purpose of this invention are described in the chapter entitled "Polyesters" by Edward H. Meyer, Modern Plastics Encyclopedia, issue for 1965, September 1964, pages 235 to 240 and the references cited therein and in "Polyesters and Their Applications" by Bjorksten et al., Reinhold, N.Y., 1956. Such resins are available from Allied Chemical Corporation under the trade name of Plaskon and from American Cyanamid Company under the trade name of Laminac. Numerous other companies also produce and sell such resins.

The proportion of egg shells to liquid resin depends upon the desired effects and upon the degree of comminution of the egg shells. The above proportion gives a highly attractive product but it will be understood that the proportions are subject to considerable variation depending upon the desired results and the size of egg shells used.

Molds are available in a great many varieties of shapes, sizes, patterns and figures for use in casting decorative articles. For example, leaves, flowers, coaster disks, fishes, birds and other highly attractive ornamental plaques have been cast. Vases, bases for lamps and other highly decorative and useful articles may be manufactured from the composition of matter of this invention by the process described. An additional and important use of the composition of this invention is in the manufacture of decorative tiles. Tiles having very attractive surface features and long wearing qualities have been made using the composition of this invention.

By way of comparison, I have used fillers known in the prior art such as limestone; however, such products as were formed had more the appearance of ceramic and did not have the variegated pottery-like finish of this invention which is highly attractive. In addition, calcium carbonate, whether from natural limestone or artificially produced, is an article of commerce in high demand. On the other hand, egg shells are generally considered a waste product and can be obtained usually for little more than the cost of recovery.

Comminuted sea shells and the like have also been used and give a rather attractive finish but such fillers do not readily accept dyes and do not otherwise give the pottery-like finish so highly desirable in this invention.

It will also be understood that the articles which are cast may be painted in part to highlight certain features thereof.

While such resinous materials as the polyesters, the epoxies, and the like are highly desirable in carrying out the process of this invention and the manufacturing, the composition and article of this invention, it will be understood any resin which may be readily polymerized after addition of the comminuted egg shells may be used. These resins are, generally speaking, thermosetting resins which are preferred in this invention.

Other objects which may be made by the process of this invention include light switch covers, pen holders, buttons, jewelry and other wall ornaments. Indeed while this invention has been described with reference to particular materials, departures therefrom may be made without departing from the spirit of the invention.

I claim:
1. A composition of matter comprising an intimate mixture of a major portion of egg shell fragments and a clear resinous polymer selected from the group consisting of polyester and epoxy resins bonding such fragments together.
2. The composition of claim 1 wherein at least some of the egg shell fragments further include a coloring agent thereon.
3. The composition of claim 1 wherein the resinous polymer is a thermosetting polymer.
4. The composition of claim 1 wherein the resinous polymer comprises a polyester.
5. An article of manufacture comprising a cast figure comprised of a major portion of egg shell fragments intimately mixed with a clear resinous polymer selected from the group consisting of polyester and epoxy resins for binding said fragments together.
6. The article of manufacture of claim 5 wherein at least some of the egg shell fragments further include a coloring agent thereon.
7. The article of manufacture of claim 5 wherein the resinous polymer is a thermosetting polymer.
8. The article of manufacture of claim 5 wherein the resinous polymer comprises a polyester.
9. The invention of claim 5 wherein the article is a tile.
10. A process for manufacturing cast figures comprising
  comminuting egg shells to a desired particle size,
  providing a resin selected from the group consisting of clear polyesters and epoxies capable of undergoing polymerization for bonding said shells,
  intermixing a major portion of the comminuted egg shells and the resin precursor,
  filling a mold of desired shape with the egg shell and resin precursor mixture, and
  maintaining the mold contents at a desired temperature to cause the resin precursor to undergo polymerization.
11. The process of claim 10 further including the steps of
  classifying the comminuted egg shell fragments according to size, and
  providing an intermixture of at least two separate desired sizes for intermixture with the resin precursor.
12. The process of claim 10 further including the step of coloring at least part of the egg shell fragments prior to intermixing the comminuted egg shell with the resin precursor.
13. The process of claim 10 further including the steps of
  classifying the comminuted egg shell fragments according to size, and
  providing an intermixture of at least two separate desired sizes for intermixture with the resin precursor.
14. The process of claim 10 wherein the step of providing a resin precursor includes intermixing a polymerizable monomer and a polymerization initiator.

References Cited
UNITED STATES PATENTS

| | | | |
|---|---|---|---|
| 512,226 | 1/1899 | Sachs et al. | 106—291 |
| 2,554,364 | 4/1949 | Hooton | 106—291 |
| 3,078,249 | 2/1963 | Russell | 260—40 |
| 3,092,836 | 6/1963 | Boggus | 106—291 |

MORRIS LIEBMAN, *Primary Examiner.*

R. BARON, *Assistant Examiner.*